(12) United States Patent  
Albert et al.

(10) Patent No.: US 8,126,488 B2
(45) Date of Patent: Feb. 28, 2012

(54) WIRELESS COMMUNICATION SYSTEM AND RELATED METHODS

(75) Inventors: David Albert, Columbia, MD (US); John Martinez, Roswell, GA (US); Steve Cornelius, Dunwoody, GA (US)

(73) Assignee: Axiometric LLC, Columbia, MD (US)

( * ) Notice: Subject to any disclaimer, the term of this patent is extended or adjusted under 35 U.S.C. 154(b) by 1695 days.

(21) Appl. No.: 11/408,053

(22) Filed: Apr. 21, 2006

(65) Prior Publication Data

US 2006/0239333 A1 Oct. 26, 2006

Related U.S. Application Data

(60) Provisional application No. 60/673,759, filed on Apr. 22, 2005.

(51) Int. Cl.
*H04B 15/00* (2006.01)

(52) U.S. Cl. ............ 455/502; 455/458; 455/404.2; 455/456.2; 370/350; 370/503; 370/252; 370/335; 370/338

(58) Field of Classification Search ............. 455/502; 370/436, 312, 314, 432, 442
See application file for complete search history.

(56) References Cited

U.S. PATENT DOCUMENTS 6,249,516 B1 6/2001 Brownrigg et al.
(Continued)

OTHER PUBLICATIONS

AAA Working Group—Hakala et al. "Diameter Credit Control Application" (Draft—ietf—aaa-diameter-cc-06.txt).*

*Primary Examiner* — Olumide T Ajibade Akonai
*Assistant Examiner* — Randy Peaches
(74) *Attorney, Agent, or Firm* — Rahman LLC

(57) ABSTRACT

A method of operating a wireless mesh network comprises generating a pseudorandom sequence element in a transmitting device and a receiving device of the network using information shared by the transmitting and receiving devices. The pseudorandom sequence element is then used to calculate a communication channel/timeslot assignment for communication between the transmitting wireless device and the receiving wireless device.

16 Claims, 5 Drawing Sheets

U.S. PATENT DOCUMENTS

| | | |
|---|---|---|
| 6,437,692 B1 | 8/2002 | Petite et al. |
| 6,791,994 B1 * | 9/2004 | Young et al. .................. 370/436 |
| 6,836,737 B2 | 12/2004 | Petite et al. |
| 6,914,893 B2 | 7/2005 | Petite |
| 2005/0240520 A1 * | 10/2005 | Stura et al. ...................... 705/39 |
| 2007/0041427 A1 * | 2/2007 | Small ............................ 375/145 |

* cited by examiner

WIRELESS COMMUNICATION SYSTEM AND RELATED METHODS

This application claims the benefit of U.S. Provisional Application No. 60/673,759 filed Apr. 22, 2005, the disclosure of which is hereby incorporated by reference in its entirety.

BACKGROUND OF THE INVENTION

1. Field of the Invention

The invention relates generally to the field of wireless communication. More particularly, the invention relates to a highly reliable, ad-hoc wireless mesh network and related methods of operation.

2. Description of the Related Art

Contemporary wireless communication networks ("networks") typically allow simultaneous communication between several independently operating wireless devices. In order to provide the simultaneous communication, it is generally necessary to coordinate the communication so that the devices do not interfere with each other's transmissions and to ensure that devices sending and receiving messages are properly tuned and synchronized with respect to each other. Devices capable of interfering with each other's transmissions are referred to as adjacent devices.

In order for transmissions to be properly sent and received, it is important that no two adjacent devices transmit data over the same communication channel at the same time, an event referred to as a collision. Where two adjacent devices transmit data over the same communication channel at the same time, it typically results in interference, making it difficult for intended recipients of the transmissions to disentangle originally transmitted data.

A common approach used in radio frequency (RF) communication in an effort ensure that no two adjacent devices transmit over the same communication channel at the same time is to divide the available RF spectrum into fixed quanta called "frequency channels", divide time into fixed quanta called "timeslots" which are aggregated into fixed groups called "frames", and allow transmitters to send data using different frequency channels or different timeslots. An example of this type of communication is frequency hopping spread spectrum communication.

In a wireless network where both the RF spectrum and time are divided up, each separate combination of a particular "frequency channel" and a particular "timeslot" constitutes a unique "communication mode" that does not interfere with other communication modes in the network. Where the available RF spectrum is divided into many frequency channels and time is divided into many timeslots, each device in the network has a large number of non-interfering communication modes that it can use to communicate, thus making it possible for a large number of devices to participate in the network without interference. In addition, since the transmissions of two devices can only cause interference if the two devices are within RF range of one another, the likelihood of interference between devices can be further reduced by manipulating the spacing of the devices and the power level of the transmissions within a network.

Figure (FIG.) 1 illustrates a wireless communication network including a plurality of wireless devices "A" through "R". Devices that are within RF range of each other (referred to as "adjacent devices") have a line drawn between them. For example, devices "A", "B", and "C" are within RF range of each other. Hence, in order to ensure that transmissions involving devices "A", "B", or "C" are properly sent and received, no two of these devices may transmit on the same frequency channel during the same timeslot. In addition, in order for device "A" to successfully transmit data to devices "B" and "C" using a particular frequency channel and a particular timeslot, devices "B" and "C" must tune into the particular frequency channel during the particular timeslot in order to receive the message.

FIG. 2 illustrates an exemplary set of communication modes for a wireless network configuration. In FIG. 2, time is divided into sequential frames comprising 24 timeslots each, and the available RF spectrum is divided into 50 frequency channels. The beginning of a frame will be referred to as a "frame time" or a "synchronized time reference". Each box in the grid shown in FIG. 2 represents one communication mode. For a particular frame of time, the number of available communication modes is the number of timeslots multiplied by the number of frequency channels, or in this case, 50*24=1200 modes.

Although dividing time and available RF bandwidth helps limit the amount of interference in a wireless network, it creates a complication for the devices of figuring out which frequency channels and timeslots the other devices are using. In order for a communication to succeed, a device transmitting data and a device receiving the transmitted data must both use the same timeslot and frequency channel. Since wireless networks often involve a large number of frequency channels and timeslots, the likelihood that a particular pair of devices will use the same frequency channel/timeslot combination by chance alone is very slim. As a result, it is useful for devices to coordinate their communications in some structured way. For example: networks that use timeslot assignment require mechanisms to synchronize the timing of adjacent transmitters and receivers to ensure successful communication.

In order to coordinate communications between adjacent devices, each device must be aware of the devices adjacent to it, i.e., the device's "adjacencies." In some wireless networks, pre-planning may allow devices to be informed a priori of adjacent devices; however, in wireless networks where devices are added or removed dynamically, manual intervention or an automatic mechanism for discovering adjacent devices may be necessary. Automatic discovery of adjacent devices typically includes a bi-directional exchange of information between the adjacent devices that facilitates future coordinated communications.

In relatively small networks, communication of information between adjacent devices (such as devices A and B in FIG. 1) may be sufficient; however, in large networks, source and destination devices are often not adjacent and the information must traverse numerous intermediate devices to reach its final destination (for example, information sent from device A to device P in FIG. 1 must traverse numerous other devices). The process of moving information across multiple devices towards a final destination is referred to as "routing."

Exemplary approaches used for routing include a priori planning (i.e., static routing), which is used when all device adjacencies within a network are fixed and known in advance, and various metric based approaches (i.e., dynamic routing), which is used in networks where device adjacencies change dynamically. The routing approach used in a particular network is generally chosen to suit the network's structure and the application performed by the network. For example, networks such as monitoring or control networks, where most information flows to or from a central point tend to use different routing approaches than networks such as peer-to-peer networks, where information flows between any two arbitrary devices.

Common properties used to characterize the performance of a routing method within a network include the method's ability to respond to dynamic changes in the network, its speed of delivery of information, the method's reliability of delivery, efficient use of network bandwidth, and efficient use of device resources (e.g. memory).

The quality of a communication link between two devices in a network may vary considerably in quality and may change abruptly. For example, a link that normally works well may become unreliable when an obstruction such as a large truck is introduced between the two devices forming the link. Moreover the quality of communication between an information source and destination separated by intermediate communication links varies with the quality of each intermediate communication link.

Certain routing methods are more reliable than others in the face of unreliable or rapidly changing intermediate links. Reliable routing methods are generally capable of quickly adapting to changing link quality and often send information along multiple simultaneous paths in order to increase the chances for proper delivery. Methods that send information along multiple simultaneous paths trade some network bandwidth and resource efficiency for increased reliability.

Network applications may attempt to compensate for lost network bandwidth and resource efficiency through efficient encoding of information. For example, the network applications may compress the information, or they may attempt to minimize the amount of overhead information sent.

For large RF monitoring and control networks, at least the above issues must be coordinated and balanced to yield a system that is reliable, efficient, and easy to maintain.

A conventional method of operating a wireless network to obtain reliable and efficient communication is described, for example, in U.S. Pat. No. 6,249,516 issued Jun. 19, 2001 to Brownrigg et al. (hereafter, "Brownrigg"). Brownrigg describes a method for transferring data between two communication networks of which one is a wireless network. To facilitate efficient and reliable communications, the bridging device maintains a map of paths within the wireless network to determine routes.

The map of paths stored in the bridging device must be updated as the quality and presence of network paths change. A central controller in the bridging device specifies an optimal path for data to traverse from each wireless device to the central controller. Due to the inherently dynamic nature of wireless networks and the interference to which they are subject, maintaining centralized path maps makes it both difficult and slow to respond to changes in the network, particularly when dealing with compromised links and large topologies.

SUMMARY OF THE INVENTION

According to one embodiment of the invention, a method of coordinating communication between a plurality of wireless devices comprises generating a pseudorandom sequence element in a transmitting wireless device by operation of a first pseudorandom sequence generator (PSG) located in the transmitting wireless device, and generating a pseudorandom sequence element in receiving wireless devices by operation of additional PSGs located in the respective receiving wireless devices. The method further comprises calculating a communication channel/timeslot assignment for communication between the transmitting wireless device and the receiving wireless devices based on the pseudorandom sequence element, and transmitting data from the transmitting device to the receiving devices according to the communication channel/timeslot assignment. Preferably, the pseudorandom sequence generators are seeded with information that is shared by the plurality of wireless devices.

According to another embodiment of the invention, a method of discovering devices in a wireless network comprises tuning a receiver in a receiving wireless device to random frequencies for a plurality of respective timeslots until a transmission is received from a transmitting wireless device, wherein the transmission includes a device identifier for the transmitting wireless device and timing information for the wireless network. Upon receiving the transmission, a local clock in the receiving wireless device is synchronized with a local clock in the transmitting wireless device, and a device identifier (ID) of the transmitting wireless device is recorded in a table in the receiving wireless device.

According to yet another embodiment of the invention, a method of operating a wireless mesh network when a wireless device within the network has lost primary power, is provided. The method comprises using a secondary power source to operate the wireless device, operating the wireless device on a reduced duty cycle, and performing synchronized transmission and reception with the wireless device based on synchronized time.

According to still another embodiment of the invention, a method of aggregating data for transmission in a wireless mesh network comprising a plurality of wireless devices is provided. The method comprises receiving and storing a table including a plurality of data items in a memory array located in a transmitting wireless device, and then, by operation of the transmitting wireless device, periodically transmitting the plurality of data items to adjacent devices. Preferably, each of the data items has a source of origin that can be ascertained from the table.

BRIEF DESCRIPTION OF THE DRAWINGS

The invention is described below in relation to several embodiments illustrated in the accompanying drawings. Throughout the drawings like reference numbers indicate like exemplary elements, components, or steps. In the drawings.

DESCRIPTION OF EXEMPLARY EMBODIMENTS

Exemplary embodiments of the invention are described below with reference to the corresponding drawings. These embodiments are presented as teaching examples. The actual scope of the invention is defined by the claims that follow.

In general application, the present invention provides a method for coordinating communication between a plurality of wireless devices (nodes) in a wireless communication network. The network can have an arbitrary topology, but the present invention is particularly applicable to wireless mesh networks. Each of the wireless devices in the network typically comprises a radio transceiver, a processing unit, a clock, a unique device identifier (ID), a volatile memory, a non-volatile memory, and a pseudorandom sequence generator (PSG).

Adjacent devices (devices that are within direct radio communications range of each other) share a certain amount of RF bandwidth available for transmitting and receiving messages. For example, in the US, devices using the industrial, scientific, and medical (ISM) band share the RF spectrum from 902-928 MHz. To facilitate communications between wireless devices using the ISM band, the available spectrum is divided into several frequency channels. In order for communications to successfully occur, a transmitting device and a receiving device must tune their radios to the same frequency channel. The spacing between frequency channels is such that transmissions on one frequency channel will not interfere with transmissions on another channel. For example, one embodiment of the present invention uses the ISM spectrum with a first frequency channel at 902 MHz, a second frequency channel at 902.5 MHz, a third frequency channel at 903 MHz, and so on. Using this technique with "C" discrete frequency channels, up to C separate communications may occur simultaneously between adjacent devices without interference if each device uses a different frequency channel. Separation of communications by frequency channel is commonly referred to as frequency-division multiplexing (FDM).

Another technique for allowing adjacent devices to communicate without interference is to separate the communications temporally so each that communication occurs within a separate timeslot. Timeslots are typically numbered and arranged in repeating sequences called frames. For example, in one embodiment of the invention, time is divided into 250 ms timeslots numbered from 1 through 24 to form 6-second frames. Within each 6-second frame, up to 24 discrete communications of up to 250 ms each may occur on a given frequency channel without interference. Separation of communications by timeslot assignment is commonly referred to as time-division multiplexing (TDM).

Figure 2:
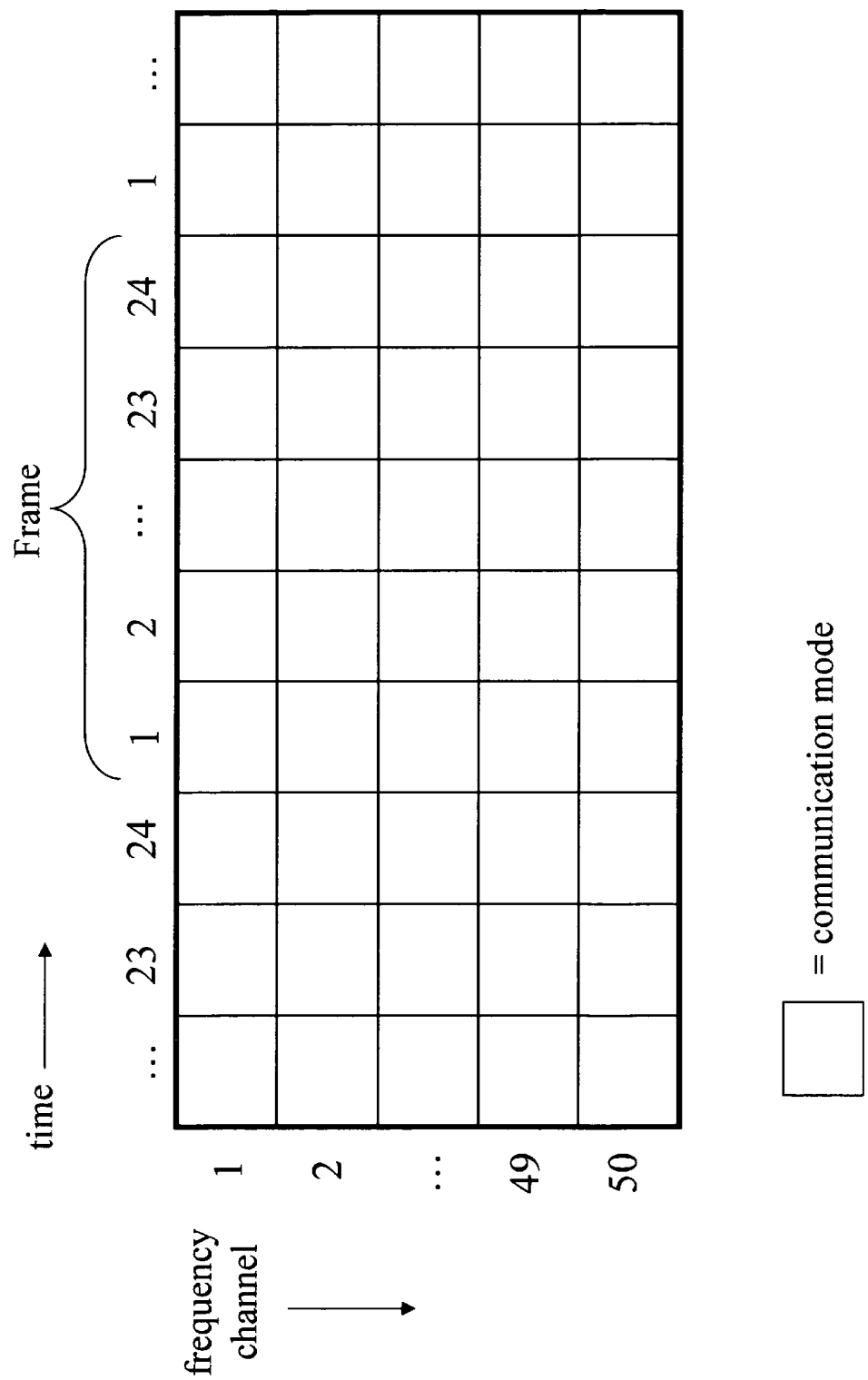
FIG. 2 is a diagram illustrating communication modes for an exemplary configuration of a wireless network.

Combining FDM and TDM techniques allows a large number of adjacent devices to communicate with a limited amount of RF bandwidth without interfering with each other. For example, as illustrated in FIG. 2, an exemplary embodiment of the invention uses 50 frequency channels and 24 timeslots per frame to yield 50*24=1200 potential discrete communications that may occur in each frame. The combination of a particular frequency channel and a particular timeslot is referred to as a communication mode.

In order to facilitate coordinated communication between adjacent devices and avoid interference, each device uses a structured technique to determine the communication mode it will use to transmit (or receive) in each frame. The technique is designed so that for any frame, each wireless device can determine the frequency channel/timeslot combination used by every other wireless device in the network, thereby allowing a transmitting device and its intended recipient(s) to tune their radios to the same frequency channel during a particular timeslot and communicate. The same technique also allows receiving devices to selectively listen to transmitting devices.

The technique used to determine the frequency channel/timeslot combination used by each device for each frame uses the pseudo-random number sequence generator (PSG) in each device and certain shared information. A PSG is a hardware device or software algorithm that, when initialized with a starting number (called a seed), outputs a sequence of pseudo-random numbers with a desired distribution.

Although the pseudo-random numbers generated by a PSG appear random, they are typically generated by a deterministic process. Accordingly, two PSGs using the same process and the same seed will generate the same pseudo-random numbers. For simplicity of explanation, it will be assumed that each PSG in a network uses the same process to generate pseudo-random numbers. As a result, it will be assumed for explanation purposes that any two PSGs using the same seed will generate the same pseudo-random sequence. In practice, all PSGs in a network do not necessarily have to use the same process or implementation to generate pseudo-random numbers.

One common implementation of a PSG is a linear-feedback-shift-register (LFSR). However, there are numerous PSG algorithms and devices that can be used interchangeably as will be understood by those skilled in the art.

To facilitate coordinated communications, each device in a network has access to or may learn through received communications information shared by other devices in the network. Examples of such shared information include a shared clock time and the unique device IDs of other wireless devices in the network.

The shared clock time typically comprises the time of a global reference clock (i.e., the "global reference clock time") as maintained by the devices within the network. For example, devices adjacent to the global reference clock obtain the global reference clock time and then relay the time to other devices in the network. Each device that receives the global reference clock time stores the time as the shared clock time. The shared clock time of each device is then updated periodically by a local clock within the device. Because the respective local clocks of each device may experience relative drift, the shared clock time as maintained by each device in the network may be slightly different. Accordingly, the shared clock time stored in each device is periodically updated in an effort to keep the devices synchronized with respect to the shared clock time.

Communication between the devices in the network is typically coordinated using the shared information in combination together with the above described property that when seeded with the same number, two PSGs will generate the same output sequence.

The following is an example of how the shared information can be used in combination with the PSGs to coordinate communication between devices in a wireless network. For example, referring to FIG. 1, for device "A" to send a message to device "B," both devices must tune their radios to the same frequency channel during the same timeslot. Devices A and B can use their shared knowledge (e.g., a combination of the shared clock time and each other's unique identifiers) to seed their PSGs, and then independently determine the frequency channel and timeslot to be used for the communication based on pseudo-random numbers produced by their respective PSGs.

At the start of a time frame "X" in which the message will be sent, devices A and B both seed their PSGs with the sum of the transmitting device's (A's) unique identifier and the time the frame will start (X). Resulting numbers (p, q) output from their PSGs are then used to select a frequency channel and timeslot for transmitting the message. For example, device A will transmit on a frequency channel "p" modulo 50 during a timeslot "q" modulo 24. As long as devices A and B maintain time synchronization, they will both be able to tune their radios to the same frequency channel during the same timeslot and exchange information.

Figure 3:
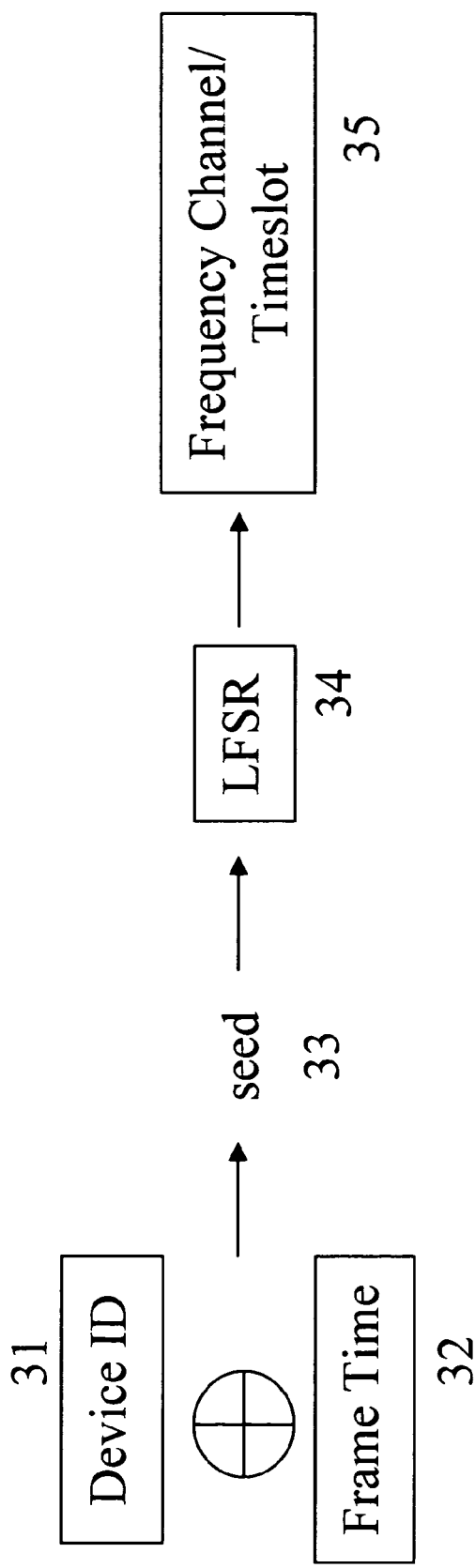
FIG. 3 illustrates a method for assigning a frequency channel/timeslot combination to a particular wireless device in a wireless communication network according to one embodiment of the invention.

FIG. 3 illustrates one example of the above described method for assigning a frequency channel/timeslot combination to a particular wireless device in a wireless communication network. Referring to FIG. 3, a device ID 31 for the device is combined with a frame time 32 to generate a seed 33. Device ID 31 and frame time 32 are part of shared information that can be accessed by all devices in the network adjacent to device 31. Frame time 32 is based on the shared clock time. Seed 33 is input to a PSG 34, such as a linear feedback shift register (LFSR). PSG 34 uses seed 33 to generate an output sequence which in turn is used to derive a frequency channel/timeslot combination 35 for the particular wireless device.

One shortcoming of the method illustrated in FIG. 3 is that although it decreases the likelihood that two devices will transmit on the same frequency channel during the same timeslot, it is still possible that such an event will occur. A different method can be used to explicitly eliminate the possibility of these collisions. One such method is illustrated in FIG. 4.

Figure 4:
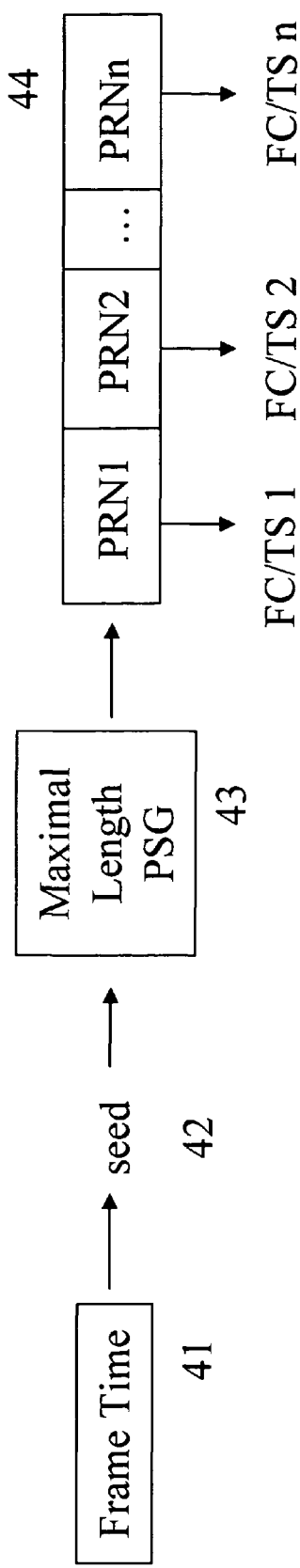
FIG. 4 illustrates a method for assigning a frequency channel/timeslot combination to a particular wireless device in a wireless communication network according to another embodiment of the invention; and, FIG. 5 is a diagram illustrating a wireless communication network including a mesh controller bridge according to an embodiment of the present invention.

FIG. 4 illustrates a method for assigning a frequency channel/timeslot combination to a particular wireless device in a wireless communication network according to another embodiment of the invention. Referring to FIG. 4, a frame time 41 based on the shared clock time is used to generate a seed 42 for a maximal length PSG 43. Maximal length PSG 43 is a pseudorandom sequence generator which produces non-repetitive pseudorandom sequences up to a certain sequence length. In order to completely avoid collisions in the communication network, the sequence length should be at least as large as the number of available communication modes in the network. Shorter length sequences will significantly reduce collisions, but not eliminate them. Maximal length PSG 43 is used to generate a data sequence 44 comprising "N" elements, where "N" is the number of devices in the network. Each of the "N" elements in data sequence 44 is used to generate a frequency channel/timeslot combination for a particular device in the network.

The particular device to which each element of data sequence 44 corresponds is determined by a mapping between device IDs and positions in data sequence 44. One way to create such a mapping is to sort the device IDs into a particular order and then let each wireless device map to the element of data sequence 44 whose position within data sequence 44 is the same as the position of the wireless device's device ID within the device ID order. For example, one could sort the device IDs into ascending order and then map the device corresponding to the first device ID to the first element of data sequence 44 and so forth. A central authority could also provide such mappings. Those skilled in the art will understand that there are many ways to create one-to-one mappings between two sets of non-repetitive elements.

For devices operating with limited stored energy such as devices powered by batteries or devices that have lost their primary power source and are operating on stored energy reserves, methods are provided to conserve energy. One method of energy conservation is to reduce the duty cycle of data transmission and reception. Another method of energy conservation is to restrict data transmission to high priority data appropriate to the situation (such as power outage notifications). The reduced duty cycle transmissions are synchronized among all network devices and are interleaved with normal duty cycle transmissions to ensure the relaying of critical or low-duty messages by all network devices.

Using the above embodiments or one of the numerous variations of such embodiments, adjacent devices may use shared information such as clock time and unique device identifiers to coordinate communications and minimize interference between adjacent devices.

The above techniques for coordinating communication between adjacent devices require communicating devices to share some common information such as the unique device identifiers and synchronized clock time. For a new device to join such a network and communicate with adjacent devices, the new device must either be provided with the shared information or it must discover the information automatically. A technique for automatic discovery of adjacent devices according to one embodiment of the invention is described below.

During each timeslot, each device in the network is generally in one of three operational states: a transmitting state, a receiving state, or a discovery state. The term "state" is used in a broad sense here to indicate an operating condition whereby the device is adapted to perform some function.

For a timeslot where a device is in the transmitting state, the device tunes itself to a frequency channel determined by one of the above described methods and transmits data.

For a timeslot where a device is not in the transmitting state, but is expecting one or more adjacent devices to be in the transmitting state, the device assumes the receiving state. Where a device in the receiving state has only one adjacent device in the transmitting state, the device in the receiving state tunes itself to the frequency channel of that adjacent device and receives transmitted data. Where the device in the receiving state has more than one adjacent device in the transmitting state, the device in the receiving state typically chooses only one of the adjacent devices to receive data from and tunes itself to the frequency channel of that adjacent device. The adjacent device can be chosen, for example, using a random strategy, or using a heuristic technique.

For a timeslot where a device is not in the transmitting state or the receiving state, the device assumes the discovery state. Most devices spend at least one timeslot per frame in the discovery state. A device in the discovery state tunes its receiver to listen for new adjacent devices. The device is considered to "discover" the presence of an adjacent device if it receives a transmission from that device. The device in the discovery state typically accomplishes this by tuning itself to various frequency channels, either randomly, sequentially, or in some other structured and predictable order such as tuning itself to the same frequency channel used that frame for its own transmission, and detecting whether any transmissions from other devices occur. The discovery state may also be used to exchange special messages between devices outside of the normal communication mechanisms described above.

In order for a new device to become integrated into the network, the device must undergo a process of initial discovery. As part of the initial discovery process, the new device needs to discover the shared clock time so as to synchronize its timing with adjacent devices and the device IDs of neighboring (adjacent) devices. A new device typically does not transmit data until it has at least discovered the shared clock time so that it can synchronize its transmissions with frame and timeslot boundaries used by adjacent devices in the network.

The following is one way for a new device to perform the process of initial discovery. Upon entering RF range of some device within the network, the new device tunes itself to a frequency channel chosen either at random or using some heuristic technique and awaits a transmission for some time period, typically equal to one frame plus one timeslot. If no transmission is received, the new device tunes itself to a different frequency channel and repeats the process until a transmission is received. Each transmission includes the shared clock time as maintained by the transmitting device and so upon reception of a transmission, a newly added device receives and synchronizes its clock to the received clock time.

The amount of time required for a new device to discover an adjacent device and thereby acquire the shared clock time depends on the number of frequency channels used by the network and the number of devices within RF range of the new device and the frequency of transmissions. Supposing that the number of frequency channels in the network is "C", the number of devices within RF range of the new device is "N", and the probability of a device using each channel is uniformly distributed, then the probability of receiving a packet during a given frame+timeslot interval is typically about N/C. Hence, on average, an adjacent device will be discovered in $C/(N*2)$ frame intervals. So, for example, where C=50, N=1, a frame lasts 6 seconds, the average time for a new device to discover a single adjacent device is 50 channels/(1 adjacent device*2)*6 second frames or 2.5 minutes.

Upon discovering an adjacent device, the new device receives the clock time, the frame boundary, and the device ID from the adjacent device. Since its clock is now synchronized with respect to the other networked devices, this device may now begin transmitting data one or more times per frame according to the coordinated communication methods described above and elsewhere in this document. As the new device continues to discover other devices in the network, it adds the device IDs for the discovered devices to an internal device ID table used to coordinate communication.

In some cases the shared clock time is provided to new devices by a mesh controller/bridge. For example, the mesh controller/bridge can be used to bootstrap a new network where no devices have yet been introduced. The mesh controller can get its timing information either through an internal clock or from an external master such as a network management system. It should be noted, however, that the timing of a mesh network need not be synchronized with any timing source outside the mesh network unless required by a higher level protocol.

In order for a new device to effectively communicate in a network, its adjacent devices must discover the new device as well. For example, in order for transmissions sent by the new device to be useful, at least one adjacent device must be tuned to receive the transmissions. The process of a new device discovering adjacent devices and adjacent devices discovering the new device is called "bi-directional discovery" (BD).

BD can be accomplished through the same discovery process as initial discovery wherein the new device is found by the existing devices via random or heuristic search. For example, using the network illustrated in FIG. 1, where device "B" discovers device "A", it acquires mesh timing from "A"'s transmission and learns "A's" device ID. Device "B" can subsequently coordinate its behavior to receive future transmissions from device "A". Device "B" will then start transmitting according to a frequency channel/timeslot assignment based on its own device ID and/or timing information.

However, until an adjacent device (such as "A" or "C") discovers device "B", transmissions from device "B" will not be received and relayed. Hence, device "B" fully joins the network after it has discovered an adjacent device and an adjacent device that is part of the network discovers device "B".

Bi-directional discovery can be accelerated by providing a specific timeslot where devices in the network will listen for new devices to announce their presence. For example, in the network illustrated in FIG. 1, where device "B" has discovered device "A" and acquired the shared clock time, and where device "A" has reserved a specific timeslot at a fixed temporal location relative to its transmission (for example, the second timeslot after it transmits and on the same channel), device "B" can immediately send a transmission to device "A" in that specific timeslot that will be received by device "A" unless another new device has also transmitted in device "A"'s frequency channel in that timeslot and there is a collision. Device "B" will continue to send transmissions to device "A" in the specific timeslot for a predetermined number of repetitions, at which point, device "B" will assume that device "A" has discovered device "B". Typically, the predetermined number of repetitions and the timing of the repetitions are determined by a randomized exponential back-off and a corresponding threshold. In the case that device "A" has not discovered device "B" after the predetermined number of repetitions, device "A" may eventually discover device "B" while operating in the "discovery state" as described above. The accelerated discovery process is typically applied to each new device that device "B" discovers.

Another modification which can be made to the bi-directional discovery process is for each device to reserve and explicitly indicate which timeslots are used for discovery. For example, where the network uses 24 timeslots, a device having three (3) adjacent devices transmits during one timeslot, listens to the adjacent devices during three (3) other timeslots, and uses 20 timeslots for discovery. For each frame, the device indicates which of the timeslots are used for discovery using a bit string wherein a "1" indicates a timeslot where device is transmitting or receiving data, and a "0" indicates a timeslot where the device is available for discovery. Typically, the device determines the bitstring at the beginning of each frame and transmits the bitstring whenever it transmits data.

Because new devices which have discovered an adjacent device will have received the device ID for the adjacent device and the shared clock time, the new device can use methods such as those described in relation to FIGS. 3 and 4 to identify which frequency channels the adjacent device will use during the timeslots used for discovery. The new device can then transmit data to the adjacent device using these frequency channels in the corresponding timeslots. The new device can choose to transmit data in any of the indicated timeslots used for discovery, and it can choose the timeslot either using a random technique or some structured approach.

In order to further reduce the likelihood that two new devices will elect to transmit data to the adjacent device during the same timeslot, thereby causing a collision, the adjacent device may transmit a bitstring indicating timeslots used for discovery during more than one frame. For instance, the adjacent device could transmit a bit string indicating the timeslots used for discovery during the rest of the current frame as well as the entirety of the next frame. In this way, new devices will have more timeslots to choose from and as a result, contention among new devices for the available timeslots is likely to decrease.

In some cases, such as when device ordering is determined by a central authority, a new device needs to be assigned a network ID in order to join the network. In such cases, the new device is generally not allowed to transmit data except during available timeslots reserved for requesting a network ID. The timeslots reserved for requesting a network ID typically comprise timeslots indicated either by a bitstring transmitted by an adjacent device as described above, or timeslots reserved at a specific predetermined temporal offset relative to a transmission from the adjacent device.

For device discovery to occur outside of the initial discovery process, the device discovery must take place during a timeslot in which one of the devices is in the discovery state and the other device involved is in the transmitting state. Suppose that the network uses "S" timeslots per frame, "C" frequency channels, and a first device uses "Sd" randomly distributed timeslots for discovery. The probability of the first device discovering a second device, which is an adjacent device that transmits during an unknown timeslot of a particular frame, is Sd/(C*S). In this case, it will take (C*S)/(2*Sd) units of time on average for the first device to discover the second device. As an example, where a device has a single undiscovered adjacent device and having a single timeslot allocated for discovery and 50 frequency channels and 24 timeslots of 250 ms each per frame, the probability of discovery during each frame is $\frac{1}{1200}$. Hence, it will take an average of 600 frames for the first device to discover the second device. If a frame lasts 6 seconds, this is one hour. Fortunately, however, as the number of devices listening for new adjacent devices increases, the probability that new adjacent devices will be discovered increases significantly.

In some networks such as those having a mesh controller, the total number of devices within the network at a given time may be broadcast to all of the devices. The broadcast can be used to accelerate the process of device discovery because the devices can use the total number of devices as a guide to direct their search for adjacent devices. For example, suppose that the total number of devices in the network is "T", where "T" is a number greater than 2 and a particular device "D" is only aware of 1 adjacent device. Since device "D" is typically able to determine the frequency channel/timeslot assignments for the remaining T-2 potential adjacent devices in the network (e.g. by generating a pseudorandom sequence of length "T" using frame time as a seed), device "D" can successively tune itself to receive transmissions from each of the remaining T-2 potential adjacent devices. In a case where device "D" does not receive a transmission from a particular device corresponding to a particular frequency channel/timeslot assignment, device "D" can assume that the particular device is not an adjacent device and therefore stop attempting to receive transmissions from that particular device. Otherwise, device "D" will quickly discover all of its adjacent devices, thereby maximizing the path redundancy in the network.

An additional mechanism for accelerating discovery is for each device to periodically transmit a list of adjacent devices from which it has directly received transmissions. For each device on the list, any device that receives the list is either directly adjacent (can communicate directly with the listed device) or adjacent to an adjacent device (cannot communicate directly with the listed device). Accordingly, the receiving device may actively seek to receive the transmissions from each of the listed devices and so determine whether they are directly adjacent or not.

As described previously, in a wireless network according to various embodiments of the present invention, each wireless device has access to some shared reference information such as a shared clock time which it uses to calculate frame times and timeslots for coordinated communication. Also described previously, each wireless device typically maintains a local clock. The local clock preferably comprises a hardware counter which is regularly incremented by a stable local time source such as a quartz crystal oscillator. The local clock is set to an initial value when it first discovers an adjacent device that is transmitting the shared clock time. Thereafter, the device's local clock is periodically updated using the device's crystal time source and by periodically re-synchronizing with adjacent devices.

The device also stores a metric indicating the accuracy of the local clock referred to as the "timing age." The timing age metric is based on how much time has elapsed since the local clock was last synchronized with the global reference clock time (an indication of clock drift) and the number of intermediate devices between the device and the global reference clock (an indication of clock jitter). Larger timing ages represent lower accuracy. A timing age of 0 represents perfect accuracy and is only stored in and transmitted by a master time source such as a mesh controller that maintains the global reference clock.

The local clock within each device receives periodic updates through transmissions from adjacent devices. The devices providing updates transmit their local clock time, together with the time elapsed since the devices were themselves last synchronized with the global reference clock time (their timing age metric). Where the received clock time has been synchronized with the global reference clock more recently than the local clock, the time received in the transmission is considered more accurate than the stored clock time. Where the received time in the transmission is considered more accurate than the stored clock time, the stored clock time is updated with the newly received clock time and the stored timing age metric is replaced with the received age +1.

According to one embodiment of the invention, the global reference clock time is provided by a global reference clock that is part of a mesh controller. The mesh controller periodically broadcasts the global reference clock time to devices in the network in the form of a bitstring, which generally comprises a 32-bit number. The number represents the number of time units (e.g. seconds, timeslots, frames, milliseconds, or some other unit) elapsed from a fixed point in time (e.g. Midnight Jan. 1, 2000).

It is desirable for the local clocks to track time in increments finer than the global reference time such as the units of time required to transmit a single bit of information. By tracking time with fine granularity and by timing the transmission of clock time and timing age metric updates with similarly fine granularity, the local clock may be used to precisely synchronize the transmission and reception times between network devices.

The stored or received timing age metric provides an indication of the accuracy of the corresponding clock time. Because the crystal time sources of the local clocks in each device tend to drift relative to each other and relative to the global reference clock time, as timing age becomes larger, the corresponding clock time becomes less accurate relative to the global reference clock time. By providing timing information in every transmission and the timing age metric indicating accuracy of the timing information relative to the global reference clock, each device may choose and synchronize with the most accurate time source available from the various messages it receives.

Devices re-synchronize their internal hardware (local) clocks each time they receive a message from a device with a lower (better) timing age metric. During the period between such synchronizations, the local clocks may drift apart due to temperature effects and other causes of inaccurate timing. The crystals and crystal oscillators from which the local clocks derive their timing are characterized for drift. With the worst case drift known, it is possible to calculate how long it will take for a local clock to drift sufficiently to potentially prevent proper transmission and reception of data within a known particular timeslot specification.

For example, in a device with a local clock known to have a worst-case drift of 25 ppm over temperature, a timeslot of ¼ second and a maximum message size of 256 bytes (2048 bits), a transmission data rate of 19200 bps (4800 bits-pertimeslot), and with messages normally transmitted centered within each timeslot, there are at least 4800−2048=2752 bits of "guard" time around the message or 1376 bits of guard time on either side of the message (roughly 71.6 ms). A hardware clock with 25 ppm accuracy will drift up to 25 uS per second. As a result, in a worst case, two adjacent devices may drift in opposite directions and so could drift apart at a rate of 50 uS/sec. With such drift, the two devices might fail to successfully communicate after 0.0716/0.00005=1432 seconds or 23.8 minutes when the transmission of one device falls outside the timeslot window of the receiving device.

To maintain communications capability between such devices, any device that has not received a timing synchronization message within the failure period of 23.8 minutes must expand the window (i.e., the timeslot) it uses to listen for messages from adjacent devices in order to be certain it will receive those messages. Since the direction of drift of its neighbors is unknown, the window expansion must be bi-directional. A reasonable increment for timeslot window expansion is units of 1 timeslot so that when a neighbor device is expected to transmit a message, e.g., in a timeslot 5, a device with an expanded window will attempt to receive the message during timeslots 4, 5, and 6.

Each time the timeslot window is expanded by 1 timeslot in either direction (2 total timeslots), the guard period is increased by the number of bits per timeslot times 2, i.e., 4800*2=9600 bits in the present example. At a drift rate of 50 uS/sec, this represents an additional 500 ms guard period/0.05 ms/sec drift or 10000 seconds (166.6 minutes or 2.7 hours) of drift tolerance. Once the timing window has expanded to fill the entire frame or beyond a predetermined threshold, timing is considered lost and the device begins the discovery algorithm to find a new neighbor device and timing source.

A network according to selected embodiments of the present invention includes a link layer for managing communications between adjacent devices in the network. The link layer provides mechanisms for identifying the source and destination(s) of each transmission. It further provides a mechanism for determining whether transmissions have been correctly received and it may also provide encryption services. Those skilled in the art will understand that several protocols, technical specifications, and so forth can be used to implement the link layer. A few of these will be mentioned here for the purpose of illustration.

Each device is assigned a unique device ID such as a 32-bit number provided by a manufacturer. The presence of a device ID allows message source and destination(s) to be unambiguously identified. A broadcast device ID (0xFFFFFFFF) may also be supported for messages to be received by all devices. Note that the device ID is different from the network ID that a mesh-controller may assign. The network ID is used for centralized coordination such as the mechanism for ordering devices within the network described above and for application layer purposes—such as allowing devices to provide denser data using array relative indexing without having to explicitly provide device IDs.

Forward error correction (FEC) algorithms such as Reed-Solomon and Golay Codes are used to correct transmission errors. The FEC algorithms calculate a fixed number of parity bytes across the entire message or portions thereof and append them to the message prior to transmission. On reception, the parity data can be used to correct a limited number of link-induced errors. Common techniques such as interleaved parity may be used to increase the efficacy of FEC algorithms.

An encryption algorithm (such as 128-bit XXTEA) is used to prevent un-authorized reception of messages. A transmitter will encrypt the message with a secret key prior to calculating and appending FEC. A receiver will decrypt the message using the same shared key following error correction. Note: the FEC parity bytes are not encrypted, however they are calculated across the encrypted data and so do not introduce a security risk. Those experienced in the art will recognize that other encryption techniques such as public key encryption algorithms may be used for the same purposes.

A 32-bit CCITT cyclic-redundancy-check (CRC) is used to determine whether data transmissions have been received with errors. Prior to encryption, a transmitter will calculate the CRC-32 of the data to be sent and include the result in the transmission. Upon reception, following FEC and decryption, the receiver will calculate the CRC-32 of the same data and compare the result to that calculated by the transmitter. If the results do not match, the data contains un-corrected errors.

Managing end-to-end exchange of information between any two devices (adjacent or not) in a network is performed by a network layer. One function performed by the network layer is routing, i.e. determining how a message will travel between a source and a destination. Several methods of routing may be employed in a network according to the present invention, a few of which will be discussed below. Examples described below include flood-routing, source-routing, and gradient-descent routing.

The most reliable method for moving data between a source and a destination is for it to take all available paths, i.e., every device will attempt to relay the data to every other device. This method is known as flood-routing and provides maximum redundancy (every path from source to destination is taken) and minimum message latency (since every path is taken, the shortest path is guaranteed to be taken). The primary disadvantage of flood routing is that the network bandwidth is poorly utilized: since every path is taken, many paths that were not needed were still occupied carrying the flooded data. Flood routing also introduces complexities such as determining when to stop relaying data.

In source routing, a transmitter specifies a path for a message to traverse including each device that must relay the message between the source and destination. This method is very bandwidth efficient as it allows the transmitter to specify exactly which path will carry the data leaving the rest of the network free to carry other data. The disadvantage of source-routing is that it requires each transmitter to have precise knowledge of the entire network topology; this places significant storage requirements on each device. Moreover, in an RF network, where network topology is subject to frequent change based on RF interference conditions (a link may be present sometimes and not present at others), a stable network topology may never develop.

Figure 5:
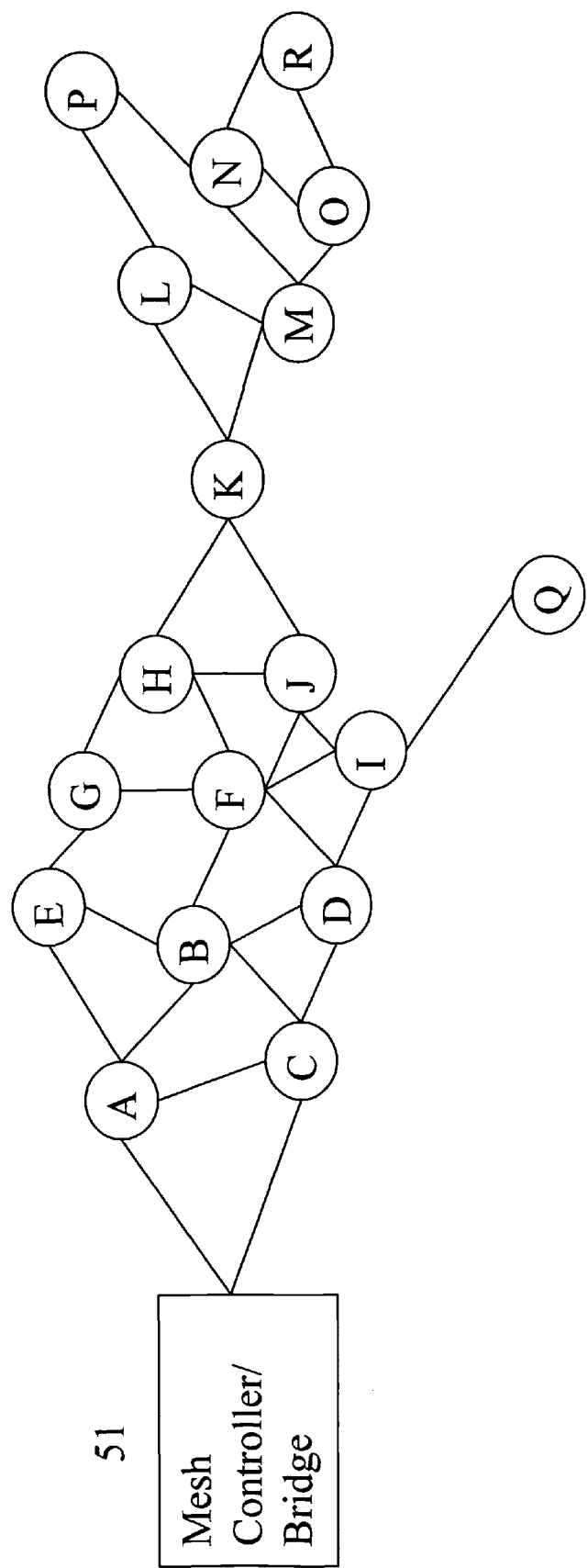

In monitoring and control networks, data primarily flows between remote devices and a central point such as a central monitoring and control system. For example, in a network illustrated in FIG. 5, data generally flows towards a mesh controller/bridge 51 for forwarding to a central monitoring system (not shown). Telemetry and monitoring and control networks typically have limited or no peer-to-peer networking requirements. This fact can be leveraged for gradient descent routing where messages are relayed (routed) towards (or away from) the central point by descending a gradient towards that point.

Using gradient-descent routing, each network device need only be aware of its distance from the central point and the distance of its neighbor devices from that point. When sending or relaying a message, each device forwards only messages that are received from devices further from the destination. As each device relays the data closer to the destination, the message eventually reaches its destination. This method minimizes the storage requirements for each device; typically only one or two bytes are required for each neighbor to determine its distance from the central point.

In traditional network routing, a variety of metrics are calculated and exchanged among routers to determine the path that a message will take. Metrics may include, for example, distance, congestion, and link quality. In RF networks, the calculation and exchange of these metrics requires significant overhead and possibly storage. Because the link characteristics of an RF network are subject to frequent change, and because these changes may have a ripple-effect, it is very difficult for traditional routing algorithms to converge on a reliable set of routes for continuous transmission of data from a large set of devices.

To address this need, in addition to serving as a mechanism for timing synchronization, timing age may serve as an effective routing metric allowing data to be transferred towards or away from a central controller using a gradient ascent/descent algorithm. In the gradient ascent/descent algorithm, messages destined for the central controller are re-transmitted if received from devices with higher timing age. Otherwise, the messages are dropped. Messages originating from the central controller are re-transmitted if received from devices with lower timing age. Otherwise, the messages are dropped.

The dynamic nature of the timing age metric allows routing to adapt automatically and quickly to changing network conditions without the use of routing tables. Dynamically changing routing tables require the use of a re-transmission algorithm since instantaneous routing changes may result in a message being dropped from all viable routes. In contrast, methods provided by embodiments of the present invention readily adapt to changing network conditions. For example, consider the following.

Data from remote devices destined for the central controller are un-acknowledged (until received by the central controller) and are transmitted to adjacent devices in round-robin fashion until they are acknowledged. For instance, suppose device A receives unacknowledged data from device B. Device B has a lower timing age metric than device A, indicating that device B has a better path to the central controller. Therefore, device A may ignore (drop) the data received from device B, e.g., by not adding the data to an internal table of unacknowledged data to be transmitted, since device B already is a better route to the central controller as demonstrated by its lower timing age.

If at some point the timing ages of devices A and B changes such that device A has a lower timing age metric than device B, and if device B has not yet received an acknowledgement from the central controller for the data, device A will accept the data from device B due to device B's higher timing age and will transmit the data to adjacent devices in round-robin fashion until the data is acknowledged by the central controller to device A.

On the other hand, acknowledgements for the receipt of device data are issued and transmitted by the central controller whenever the central controller receives unacknowledged versions of the device data. If device A has a lower timing age than device B and device B transmits an acknowledgement to device A, device A does not need to add the acknowledgement to its list of acknowledgments to transmit since device B is already further from the central controller than device A.

A similar approach may be used to route commands and command responses with the timing age relationship reversed. For example, commands received from devices with lower timing age can be forwarded/routed, while responses received from devices with higher timing age are forwarded/routed.

In general, a data item is marked as acknowledged or unacknowledged by including an acknowledgment indicator with the data item. For example, the acknowledgment indicator could comprise a bit that gets set, e.g., set to '1', to indicate that a destination device received the data item, and the bit gets cleared, e.g., set to '0' when the data item is first transmitted from its source of origin device.

The various routing methods described herein may be used in combination depending on the data to be routed. For example, a message sent from a device to the central controller may include a list of the devices traversed along the way (e.g., while using gradient descent routing). The mesh controller may then reply to the device by specifying the reverse path (e.g., using source routing).

RF communications links may be adversely and intermittently affected by numerous factors including obstacles, reflections, and interference from other transmitters. Referring to the network illustrated in FIG. 1 above, at any time, the communication path between devices "A" and "B" might be better than the path between devices "C" and "B". To maximize the probability of a transmission from device "B" reaching the mesh controller, both devices "A" and "C" should attempt to receive and relay transmissions from device "B".

More generally, when a device "X" transmits, it is desirable to have as many devices within RF range of device "X" receiving and relaying that transmission as possible. Such an arrangement increases reliability through maximum redundancy of paths and relays. As discussed above, this is the primary benefit of flood routing. If the bandwidth requirements are sufficiently low that data may be delivered via flood routing, this is the optimal choice for an RF mesh network.

Methods such as gradient descent routing may offer improved bandwidth management while still providing very high levels of redundancy and therefore reliability of message delivery. Using gradient descent routing, each message is sent over all possible paths that move it in the desired direction with respect to the timing age metric.

To achieve this path redundancy, each device typically maintains a list of devices within RF range (adjacent devices). A device is considered within RF range if a transmission from that device has been directly received without relaying. At the start of each frame, each device calculates the frequency channel/timeslot assignments for itself and each device within RF range and attempts to receive and possibly forward each message sent by the adjacent devices If a device is not heard from for a predetermined time period, the device is removed from the table and must be re-discovered for direct 2-way communications with that device to resume.

One problem with the path redundancy mechanism described above is that the network topology in telemetry and monitoring/control networks is typically a tree rooted at the central controller. Data generally flows from the leaves towards the root of the tree. Accordingly, devices closer to the tree receive more data than devices at the leaves which causes congestion. This presents a problem in traditional networks that requires complex flow-control and bandwidth allocation mechanisms to balance the flow of data into the root of the tree. In a telemetry or monitoring/control network with data continuously flowing towards the root of the tree, this is a significant problem.

This problem is addressed differently for data that flows continuously towards the root than for data that flows intermittently between the root and any particular devices. For continuous data, one solution to the problem is data compression and aggregation: the data for the entire mesh is compressed to allow it to be completely cached on every device. Each device maintains the complete status of every other device in the mesh. Received messages are examined for status data that is newer than the cached data and the cache is updated accordingly. Transmitted messages contain the latest cached information. This allows the number of received messages to be much larger than the number of transmitted messages without creating congestion.

An extreme example of data aggregation is used to achieve maximum energy conservation during extraordinary conditions such as loss of primary power, during power loss, devices are run on a reduced duty cycle: devices are powered down or reduced to minimum power usage (e.g. radio off) for most of the cycle and then synchronously powered up to exchange status messages. It is critical that all devices power up at the same time to support relaying of messages. The global reference clock time is used to achieve this with all devices transmitting and receiving critical status information such as alarms and power status during a key frame that starts at the top of each minute (or some other fixed interval). By limiting the transmission and reception duty cycle such as to one frame per minute, an extended run-time is achieved at the expense of critical data reporting latency (in the worst case, each relay hop towards the mesh controller takes one duty cycle).

During critical events such as loss of power, critical information such as power status data is packed as tightly as possible, usually requiring no more than two bits per device (power status bit, valid bit). Power outage reports are latching for a fixed duration (e.g. 15-minutes) after which they automatically clear on the reception of the next valid power status report during the next interval. This effectively reduces the granularity of power outage detection to that interval, however it maximizes the opportunities for detection and reporting.

For data that is not continuous in nature, alternate routing mechanisms are supported using one or both of the following mechanisms. In one mechanism, a variable-length in-band embedded operations channel (EOC) is provided as part of every flood-routed or gradient ascent routed message exchanged. Because this channel is flood routed or gradient ascent routed, it is maximally reliable, but of low bandwidth. In another mechanism, during non-flood-routed (e.g. discovery) timeslots, messages are sent directly from one device to another using the mechanism described above and depicted in FIG. 3 or 4. Using a combination of flooding, gradient-descent, and source routing, messages may be exchanged directly between the mesh controller and one or more devices. This method results in higher bandwidth, but reduced reliability.

Figure 1:
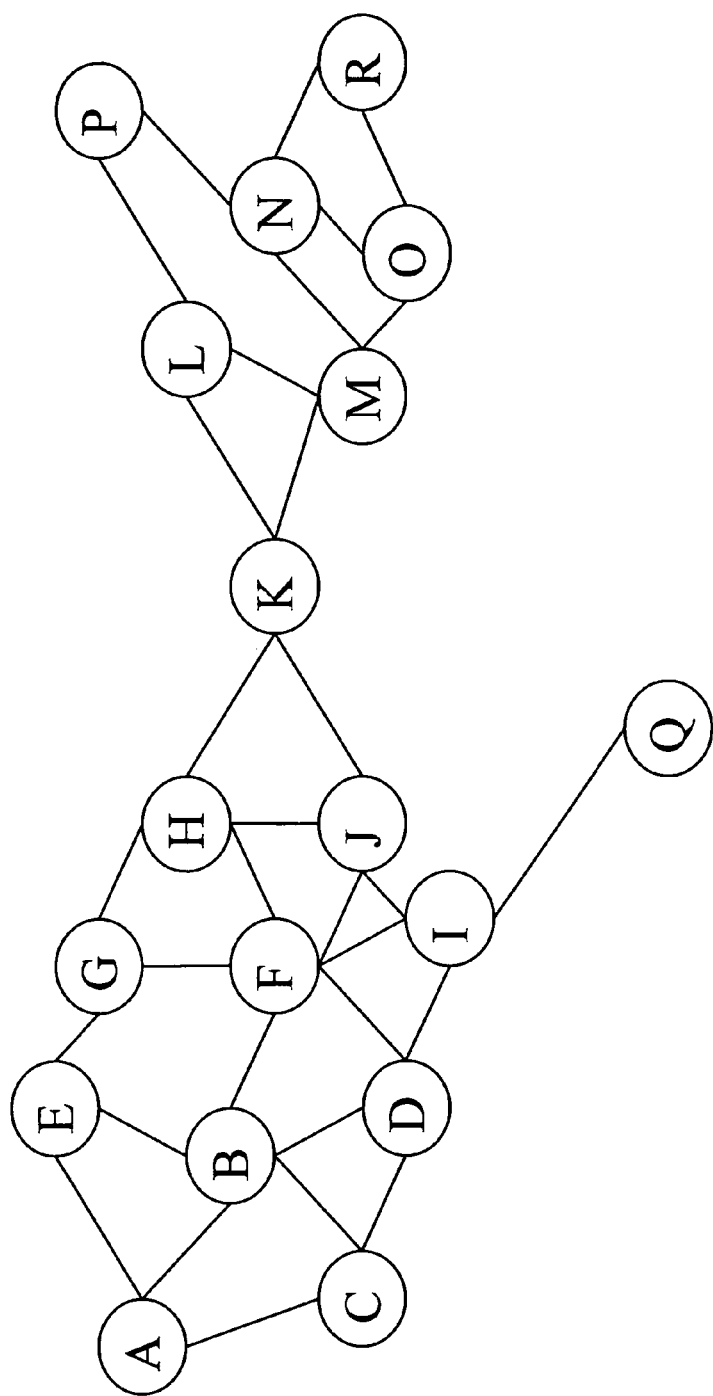
FIG. 1 is a diagram illustrating a structure for a wireless communication network.

For example, referring to the network illustrated in FIG. 1, the mesh controller could request the complete status and inventory data from device H by flood-routing or gradient ascent routing a (small) request in the in-band EOC. When the request reaches H, it could send a (large) response message back to the gateway using gradient descent routing. The message might then follow the path H->F->B->A->Mesh Controller with each device randomly choosing a closer device as the next relay destination and the path traveled being accumulated into the response message. The mesh controller might then respond with a provisioning message that is source-routed (explicitly told to traverse A->B->F->H).

As discussed above, each device caches the status of all other device in the network and broadcasts that status during its assigned timeslots. Received status messages are used to update the cached mesh status. By flooding or gradient descent routing status and maintaining high path redundancy, a very high-reliability network is developed achieving near-optimal redundancy. This method requires high data density in each transmission and a method to allow devices to determine whether received data is newer or older than cached data and update their caches accordingly. Such methods may be inherent in the nature of the data or may require an explicit timestamp for groups or individual pieces of data. For example, for monotonically increasing data such as a usage counter the relative age of any data received is inherent in the data.

Each device maintains a packed table containing the status of every device in the network. Each entry in this table must include a device ID (unless implicit through ordering); device data (e.g. interval energy usage, power status, etc.); an optional data timestamp (how old is this data e.g. in frames); and, a device routing metric (optional—e.g. how many hops from the mesh controller).

During each transmission, every device broadcasts some portion of its cached table (e.g. data and timestamps for devices 1-100). Each received message is examined for newer data and the device updates its packed table if newer information is found.

As discussed previously, under certain extraordinary circumstances such as loss of primary power, power failure alarm reporting constitutes a special case. A frame is reserved on a reduced duty cycle (e.g. one frame per minute) that is dedicated to reporting and relaying power status. The power status message typically includes a timestamp indicating what interval the status covers (e.g. which 15-minute period) and 2-bits per device indicating power status and validity of that status.

Where a message is received for the current interval with the valid bit set and the cache does not contain valid data, the cache is updated with the new data. Where a message is received for the current interval with the valid bit set and the cache also contains valid data, new power-OK status is ignored, new power-failed status updates the cache (power-failure takes precedence). At the end of each interval, the valid bit is cleared for all devices.

Power failures during a given interval (e.g. 15-minute period) for a given device result in the reporting of the power failure for that device for the entire interval. The granularity of the power failure detection is the interval.

In another embodiment of the invention, a wireless mesh sensor network is provided, wherein all (or most) of the devices in the mesh are periodically taking readings (e.g. reading an electric utility meter, reporting ambient temperature, etc.) and reporting those readings back to one (or a small number of) central collection points to be forwarded onto other communications media or stored for future collection.

Within the context of the wireless mesh sensor network, it is desirable to minimize the amount of data in each radio transmission required to deliver the sensor data to the central collection point(s) for several reasons. For example, less data transmitted per sensor reading means that, for a given speed of mesh network, (say, 9600 bps,) more devices can be accommodated, or the same number of devices can take sensor readings more frequently, or the same number of devices can retransmit their data more frequently (thereby increasing reliability in an environment with poor radio links,) or, in the case of battery-powered devices, can increase the service life of a device by decreasing the power consumed by the radio per unit time.

In a classic mesh network environment, where individual messages are routed from endpoint to endpoint, there is a lot of overhead associated with each reading that must be delivered to the collection point. For example, to deliver a single, 32-bit reading via a 'ZigBee' (IEEE 802.15.4) network, the 32-bit reading is wrapped in a minimum of another 160-200 bits of network overhead (e.g., addressing, checksums, etc.) A device in this type of network can improve the 'payload to overhead' ratio by waiting until it has collected several readings and then sending them at once, but in many cases this is undesirable, because the data needs to be delivered in 'real-time.' For example, for a network of weather sensors reporting hourly temperature and rainfall for a long-term climate study, it would be perfectly reasonable for the sensor devices to report a day's worth of readings at once yielding a much better ratio of payload to overhead. However, where the data is being used to report current weather conditions, the latency is unacceptable.

Selected embodiments of the present invention are designed to increase the payload to overhead ratio by maintaining a data cache in each device for data recently received from other devices. Each time a device has an opportunity to transmit, it transmits a message including its own data and as much cached data received from other devices as will fit in the message. For example, a device at the periphery of the network, may receive reports from 10 devices on the edge of the network, the receiving device will store (i.e., cache) all those reports locally, and then during its next transmission send just one message, with all 10 reports aggregated into a table. If the number of received reports exceeds the space available in a message, different readings are selected for each transmission in order to give each reading a fair chance at being delivered.

A simplified example of such an aggregated readings table is provided as Table 1 below. In Table 1, the readings table stores cached data from four different devices.

TABLE 1

| Row | GUID | DATA |
|---|---|---|
| 1 | 127 | 876876 |
| 2 | 154 | 24326 |
| 3 | 965 | 14235 |
| 4 | 543 | 09917 |

Each entry in Table 1 is individually associated with the globally unique device ID of a device where the entry originated. The device where the entry originated can also be referred to as a "source of origin" for the data. Unfortunately, this simple and straightforward scheme has a significant shortcoming. Where the data for a single sensor reading is small (e.g. a single 32-bit quantity for an electric utility meter reading), then the Device ID itself may constitute an overhead of 50% or more. In other words, a single row in the table might include a 32-bit Device ID and 32 bits of data. Such a high rate of overhead is generally undesirable, as it tends to decrease the available bandwidth for transmitting data.

For purposes of comparison in the following discussion, it will be assumed that a reference aggregated readings table includes a collection of 32-bit globally unique device IDs, each associated with a 32-bit data payload so that each row in the reference table has a payload/table-row-size ratio of 0.5. The reference table will be used as a baseline for comparing improvements in the overhead to data payload ratio. Improvements in this ratio are described below using various means of reducing the size of required overhead data such as the Device ID associated with the data in each row of the table.

The following is a description of a first improvement in the payload/table-row-size ratio. The first improvement reduces the size of the overhead by mapping the globally unique device ID to a smaller locally unique device ID. Where each globally unique device ID (GUID) comprises a serial number or another other globally unique identifier (such as an IEEE GUID, or a TCP/IP address,) it is typically fairly large. For example GUIDs typically comprise 48-64 bits and IP addresses are generally 32 bits.

When a device first joins a network such as a mesh, it reports its GUID to a central mesh controller. The mesh controller enters the GUID in an internal list of network members, assigns a lowest unused number in the list to the new device as a "locally unique ID." The mesh controller then sends a message with the "locally unique ID" back to the device. As an example of this process, the first device to join the network and report its GUID to the central mesh controller is assigned a locally unique ID of '1'. The next device is assigned '2.'

Once a device is assigned a locally unique ID, other devices store data in their aggregated readings tables using the locally unique ID rather than the GUID. In this way, the number of bits used to identify each device only needs to be large enough to support the maximum number of devices in a single network. For example, a 12-bit locally unique ID is sufficient to distinguish each device in mesh of over 4000 devices. Thus, when a device transmits its aggregated table of readings, it needs only 44 bits per row. This is a 32% reduction in the table-row-size relative to the reference table, and an improved payload/table-row-size ratio of 72%. For discussion purposes, the process of reporting a globally unique ID to the mesh controller and being assigned a locally unique ID in return will henceforth be described as 'the registration process'.

A second improvement, which builds on concepts of the first improvement, will now be described. For the second improvement, we assume that each device in the mesh has registered for a locally unique ID (LUID), as described in the first improvement. Since the locally unique IDs are allocated as integers from 1 to N, where N is the number of devices in the mesh, we can eliminate the need for transmitting any device IDs at all in the data table, by making the device ID implicit in the data's position in the table. For example, in a simple network with 10 devices, we can assume that the devices in the network have been numbered 1 through 10 by the mesh controller. Accordingly, we can transmit a table with 10 entries in each message. Data for a first device with a LUID '1' goes in a first row '1' of the table, data for a second device with LUID '2' goes in a second row '2,' and so on. When data associated with a particular LUIDs arrives at the mesh controller, the mesh controller can use its internal table to map the position of the data back to a corresponding GUID, and report the data as coming from the correct GUID. This method delivers optimal data density, since the payload/table-row-size ratio is 1.0. Moreover, it eliminates the need for tagging each piece of data with a device ID.

A third improvement, which builds on concepts of the second improvement, will now be described below. In a network with many devices, the size of the aggregated readings table will exceed what can be transmitted in a single message. In this case, a device can transmit a different sub-range of the rows in its aggregated readings table stored in its data-cache during each transmission. The transmission including the sub-range can be prefixed by the starting index of the sub-range For example, as a simplified illustration of the third improvement, a message including the following message illustrated in Table 2 could be transmitted.

TABLE 2

| First Row Number | Data | | | |
|---|---|---|---|---|
| 42 | 765765 | 654654 | 25434 | 15343 |

In this example, a receiver can detect that this message contains data from devices with LUIDs ranging from 42 to 45 based on the first row number. This method provides almost the same payload/table-row-size ratio as the second improvement, but it can be used with much larger meshes.

In large networks, most devices only receive data from a subset of the other devices in the network. As a result, there will be empty spaces in the devices' aggregated readings table. A table, with several empty rows and some non-empty rows will henceforth be referred to as a "sparse table." It is desirable to transmit a subset of this sparse table as efficiently as possible.

In the general case, the transmission of a subset of a sparse table of data will contain three elements: an indication of where the range being transmitted starts, a compressed description of which rows in the table are non-empty (hereafter referred to as the metadata), followed by rows of data from the non-empty rows.

For example, suppose a cache contains data collected from 3 devices with IDs ranging between 100 and 109. A message used to efficiently transmit this information might contain the following information illustrated in Table 3 below. In Table 3, the starting row of data contained in the message is included under the label "Starting Row," and a bitstring labeled "Metadata" indicates empty rows with a '0' and non-empty rows with a '1.' The data contained in the non-empty rows is included under the label "DATA."

TABLE 3

| Starting Row | Metadata | DATA | | |
|---|---|---|---|---|
| 100 | 1001000010 | 647 | 826 | 193 |

Refinements to the third improvement may be made by reducing amount of metadata describing which entries in the table have data, and which entries do not. Logically, this problem is equivalent to the problem of efficiently compressing a bitstring containing 1s and 0s, which may be achieved using a number of algorithms known to those skilled in the fields of computer science and data compression.

An improved transmission format where the metadata portion of a sparse table is compressed using simple run-length encoding. Another improved transmission format specifies the metadata portion of a sparse table as compressed using a modified-Huffman code, such as is used in the CCITT 'Group 4' fax transmission standard.

Embodiments of the present invention, as described herein find ready application in a number of fields. One field in particular is the field of Automatic Meter Reading (AMR). According to one example embodiment of the present invention, the method of coordinating communication in a wireless communication network is used to facilitate communication in a mesh network comprising a plurality of devices which collect data regarding usage of a particular resource, e.g. power, water, gas, etc. The devices in the mesh network typically relay the data to a mesh controller, which sends the data to a central database for further processing. The devices in such a network can also be used to communicate other types of information such as whether a power failure has occurred and for controlling devices such as thermostats or remote power cut-off devices. A method for dealing with power failure is described above.

Other applications include inventory management such as tracking the contents and location of shipping and trucking containers as they move through warehouses, docks, etc. Other applications also include industrial energy management and agricultural systems.

Although exemplary embodiments presented above are described as dividing available RF spectrum into "frequency channels", it should be understood that the invention can be implemented using other types of communication channels, some of which may not divide the available spectrum according to frequency. For example, some embodiments of the invention use code division multiple access (CDMA), whereby each transmission uses the full available spectrum but encodes transmitted data with a pseudorandom digital sequence, as in code division multiple access (CDMA) communication. Accordingly, the term "communication channel" should be read to broadly refer to any distinct mode of communication between two devices or entities, wherein the path does not interfere with another such mode of communication.

In contrast to conventional methods, such as those described in Brownrigg and elsewhere, methods defined by selected embodiments of the present invention allow data distribution and routing decisions to be made independently by each wireless device without the need to maintain maps of paths through the network. Moreover, routing approaches provided by selected embodiments of the invention allow devices to respond quickly to network changes, independent of central coordination. Moreover, methods provided by embodiments of the invention eliminate memory and storage requirements for maintaining path maps, and the delays associated with sending re-routing and network update data to and from a central controller.

Various routing techniques provided by embodiments of the invention offer advantages for wireless networks and particularly for wireless mesh networks in that a single routing metric can be used by each device in a network to independently determine a best next step(s) for each transmission taking into consideration both topology and the quality of all of the wireless links in each available path to that wireless device.

The foregoing embodiments are presented as teaching examples. Those of ordinary skill in the art will understand that various changes in form and details may be made to the exemplary embodiments without departing from the scope of the present invention as defined by the following claims.

What is claimed is:

1. A method of coordinating communication between a plurality of wireless devices, the method comprising:
    generating a pseudorandom sequence element in a transmitting wireless device by operation of a first pseudorandom sequence generator (PSG) located in the transmitting wireless device;
    generating a pseudorandom sequence element in a receiving wireless device by operation of a second PSG located in the receiving wireless device;
    calculating a communication channel/timeslot assignment for communication between the transmitting wireless device and the receiving wireless device based on the pseudorandom sequence element; and
    transmitting data from the transmitting wireless device to the receiving wireless device according to the communication channel/timeslot assignment,
    wherein the first and second pseudorandom sequence generators are seeded with information that is shared by the plurality of wireless devices, wherein where the receiving wireless device has more than one adjacent wireless device transmitting data during a timeslot in which the receiving wireless device is receiving data, the receiving wireless device decides to receive data transmitted by the transmitting device using random selection or a heuristic technique, wherein the information that is shared by the plurality of wireless devices comprises a combination of a reference clock time and a plurality of unique device identifiers, wherein the reference clock time is derived from a common global reference clock time that is shared by the plurality of wireless devices, wherein each of the plurality of wireless devices contains a local clock adapted to maintain the reference clock time, wherein said method further comprises expanding a timeslot window for transmitting or receiving data in at least one of the plurality of wireless devices to compensate for drift of the local clock, and wherein maintaining the reference clock time comprises:
  receiving a transmission encoding a global reference clock time and a new timing age indicating an amount of elapsed time since the global reference clock time was transmitted from a global reference clock time source;
  determining whether the new timing age is less than a current timing age associated with the local clock;
  upon determining that the new timing age is less than the current timing age, updating the local clock with the global reference clock time and updating the current timing age with the new timing age; and
  incrementing the local clock and the current timing age at regular time intervals.

2. The method of claim 1, wherein maintaining the reference clock time further comprises:
  incrementing the timing age each time the local clock is updated with the global reference clock time.

3. The method of claim 1, wherein expanding the timeslot window comprises:
  determining a rate of the local clock drift;
  measuring an elapsed time since a last update of the timeslot window, and
  expanding the size of the timeslot window by an amount proportional to the elapsed time multiplied by the rate of the local clock drift.

4. The method of claim 1, further comprising:
  by operation of the transmitting wireless device, determining a timing age associated with an adjacent wireless device; and
  transmitting data from the transmitting wireless device to the adjacent wireless device based on whether the current timing age is greater than or less than the respective timing ages of other adjacent wireless devices.

5. The method of claim 1, further comprising:
  by operation of the receiving wireless device, determining a timing age associated with an adjacent wireless device; and
  processing data from the adjacent wireless device based on whether the current timing age is greater than or less than the respective timing ages of other adjacent wireless devices.

6. The method of claim 1, wherein the first and second PSGs each comprise a maximal-length pseudorandom sequence generator.

7. The method of claim 1, further comprising:
  disregarding the received time if the timing age exceeds a predetermined threshold value.

8. The method of claim 1, wherein transmitting data from the transmitting wireless device to the receiving wireless device according to the communication channel/timeslot assignment comprises:
  tuning a transmitter of the transmitting wireless device and a receiver of the receiving wireless device to a communication channel specified by the communication channel/timeslot assignment; and
  transmitting the data from the transmitting wireless device to the receiving wireless device during a timeslot specified by the channel/timeslot assignment.

9. A method of coordinating communication between a plurality of wireless devices, the method comprising:
  generating a pseudorandom sequence element in a transmitting wireless device by operation of a first pseudorandom sequence generator (PSG) located in the transmitting wireless device;
  generating a pseudorandom sequence element in a receiving wireless device by operation of a second PSG located in the receiving wireless device;
  calculating a communication channel/timeslot assignment for communication between the transmitting wireless device and the receiving wireless device based on the pseudorandom sequence element; and
  transmitting data from the transmitting wireless device to the receiving wireless device according to the communication channel/timeslot assignment, wherein the first and second pseudorandom sequence generators are seeded with information that is shared by the plurality of wireless devices, wherein the information that is shared by the plurality of wireless devices comprises a combination of a reference clock time and a plurality of unique device identifiers, wherein the reference clock time is derived from a common global reference clock time that is shared by the plurality of wireless devices, wherein each of the plurality of wireless devices contains a local clock adapted to maintain the reference clock time, and wherein maintaining the reference clock time comprises:
  receiving a transmission encoding a global reference clock time and a new timing age indicating an amount of elapsed time since the global reference clock time was transmitted from a global reference clock time source;
  determining whether the new timing age is less than a current timing age associated with the local clock;
  upon determining that the new timing age is less than the current timing age, updating the local clock with the global reference clock time and updating the current timing age with the new timing age;
  incrementing the local clock and the current timing age at regular time intervals; and
  expanding a timeslot window for transmitting or receiving data in at least one of the plurality of wireless devices to compensate for drift of the local clock.

10. The method of claim 9, wherein maintaining the reference clock time further comprises incrementing the timing age each time the local clock is updated with the global reference clock time.

11. The method of claim 9, wherein expanding the timeslot window comprises:
  determining a rate of the local clock drift;
  measuring an elapsed time since a last update of the timeslot window, and expanding the size of the timeslot window by an amount proportional to the elapsed time multiplied by the rate of the local clock drift.

12. The method of claim 9, further comprising:
by operation of the transmitting wireless device, determining a timing age associated with an adjacent wireless device; and
transmitting data from the transmitting wireless device to the adjacent wireless device based on whether the current timing age is greater than or less than the respective timing ages of other adjacent wireless devices.

13. The method of claim 9, further comprising:
by operation of the receiving wireless device, determining a timing age associated with an adjacent wireless device; and
processing data from the adjacent wireless device based on whether the current timing age is greater than or less than the respective timing ages of other adjacent wireless devices.

14. The method of claim 9, wherein the first and second PSGs each comprise a maximal-length pseudorandom sequence generator.

15. The method of claim 9, further comprising disregarding the received time if the timing age exceeds a predetermined threshold value.

16. The method of claim 9, wherein transmitting data from the transmitting wireless device to the receiving wireless device according to the communication channel/timeslot assignment comprises:
tuning a transmitter of the transmitting wireless device and a receiver of the receiving wireless device to a communication channel specified by the communication channel/timeslot assignment; and
transmitting the data from the transmitting wireless device to the receiving wireless device during a timeslot specified by the channel/timeslot assignment.

* * * * *